July 23, 1963  H. E. LOHMAN  3,098,680
COLTER ASSEMBLY
Filed Sept. 28, 1961  2 Sheets-Sheet 1
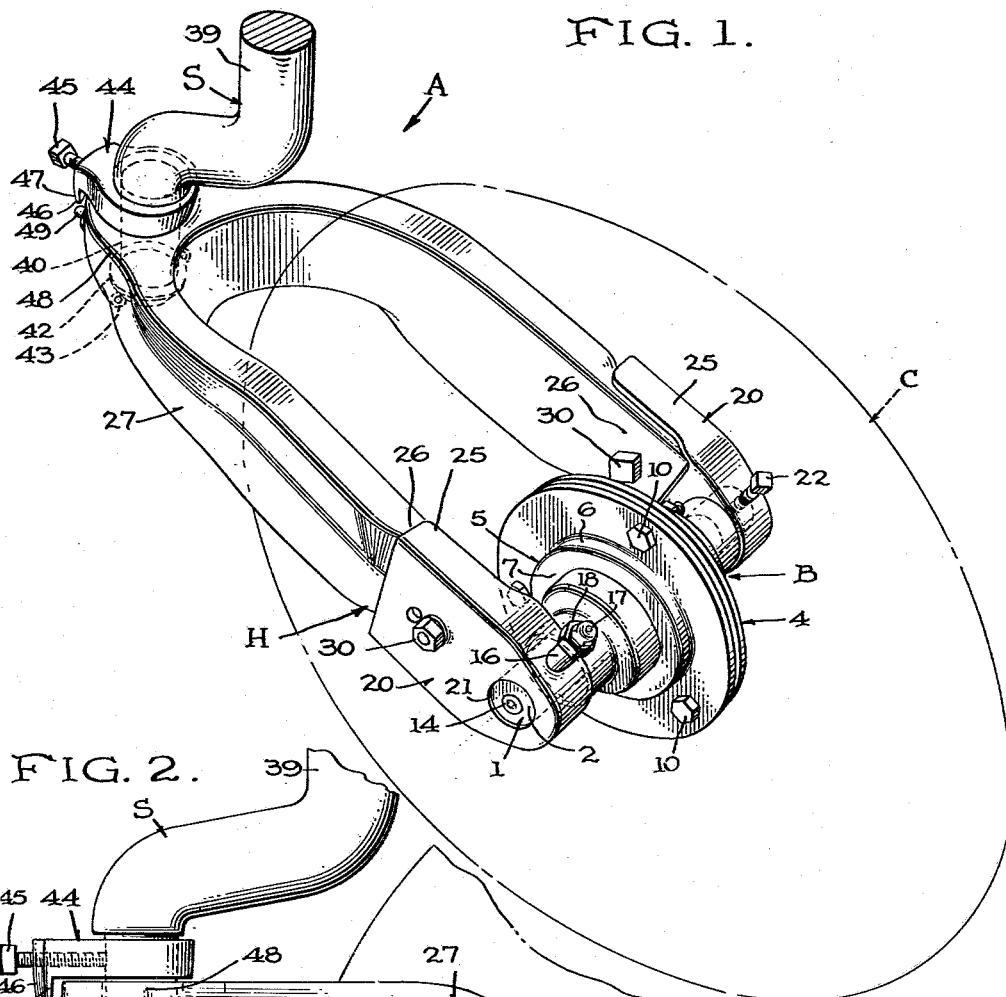
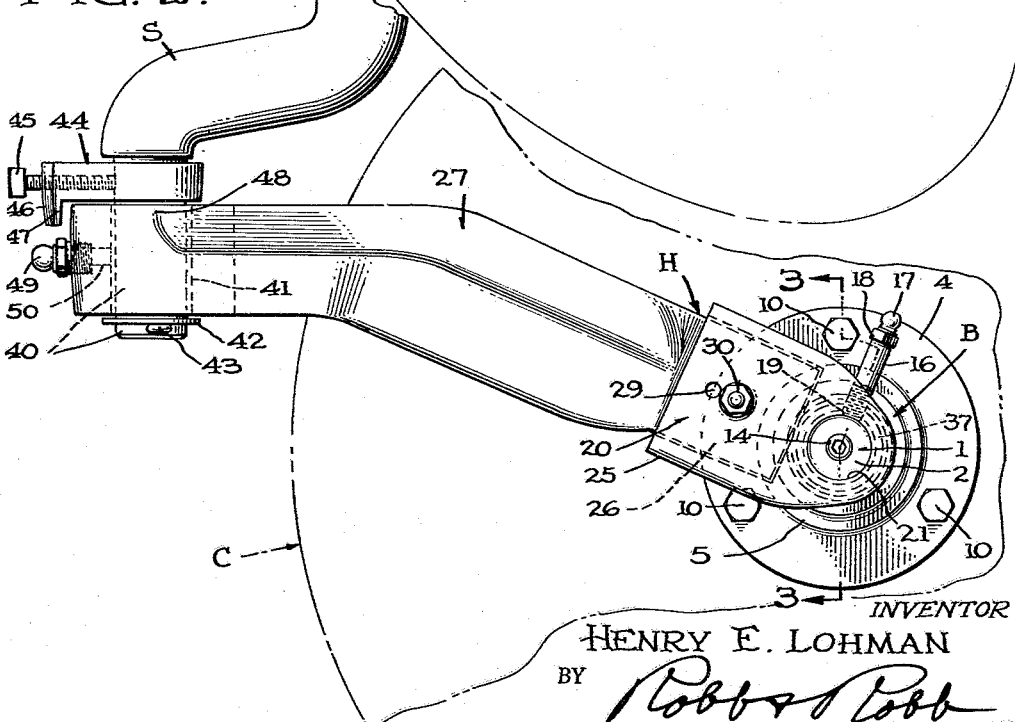
INVENTOR
HENRY E. LOHMAN
BY Robb & Robb
ATTORNEYS July 23, 1963 H. E. LOHMAN 3,098,680
COLTER ASSEMBLY
Filed Sept. 28, 1961 2 Sheets-Sheet 2
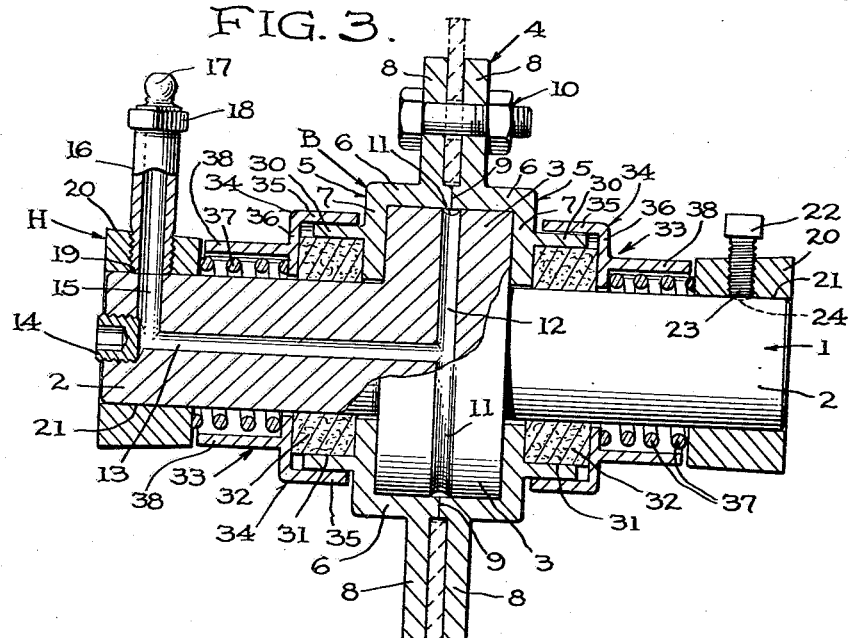
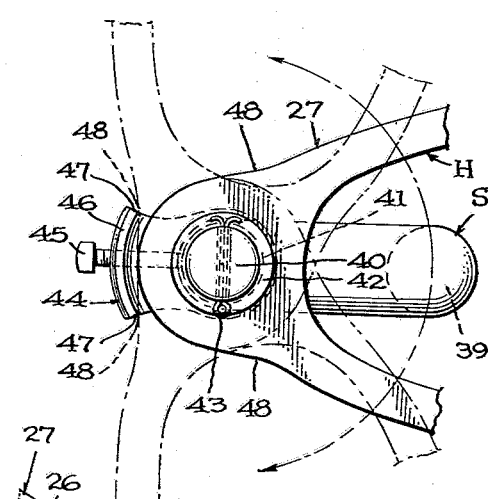
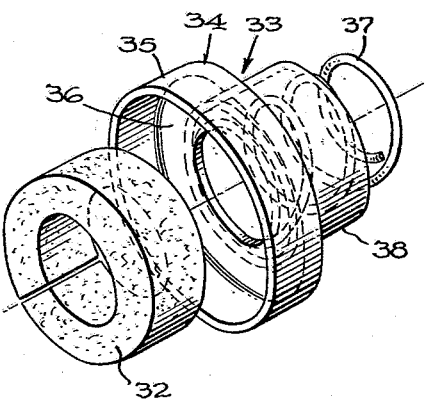
INVENTOR
HENRY E. LOHMAN
BY Robb & Robb
ATTORNEYS

United States Patent Office 3,098,680
Patented July 23, 1963

3,098,680
COLTER ASSEMBLY
Henry E. Lohman, 301 S. 8th Ave., Salina, Kans.
Filed Sept. 28, 1961, Ser. No. 141,358
2 Claims. (Cl. 308—19)

This invention relates generally to land cultivating devices, and more particularly to colters for use with agricultural implements such as plows and the like. More particularly, the invention appertains to an improved bearing or journal assembly and lubricating means for colters and the like.

A primary object of this invention is to provide improved bearing and lubricating means to assume a freely rotatable and freely pivotal colter disc, with attendant longer life and trouble free operation.

Another important object of this invention is to provide in combination with the aforesaid bearing and lubricating means, improved dirt and weed guard means to prevent the entrance of dirt and other foreign matter and the entanglement of weeds and grasses within and about the journal or bearing assembly.

Still another object of the invention is to provide in combination with the bearing assembly aforesaid, an improved stop attachment means in conjunction with an associated hanger yoke and a hanger spindle as used to suspend a colter disc and bearing assembly from a plow beam, said stop attachment means being adaptable for mounting upon the spindle and cooperable with laterally spaced shoulders provided on the yoke to limit lateral swinging movement of the latter and the colter disc carried thereby.

The foregoing and other objects and advantages of my improved colter bearing assembly will become more apparent from the following detailed description, taken in conjunction with the associated drawings and the novel features thereof will be defined in the appended claims.

In the drawings:

FIG. 1 is a perspective view showing my improved colter assembly, with the bearing hanger yoke and spindle shown in full lines and with the colter disc or blade shown in full lines and with the colter disc or blade shown in broken outline for better clarity of the assembly per se;

FIG. 2 is a view in side elevation of the colter assembly shown in FIG. 1, with the colter disc and hanger spindle being shown only fragmentarily;

FIG. 3 is an enlarged transverse cross-sectional view of my improved bearing assembly as viewed substantially on line 3—3 of FIG. 2, and with certain components being shown partly in section and partly in full elevation;

FIG. 4 is an exploded perspective view on approximately the same scale as FIG. 3, showing the details of the lubricant and dust packing ring, the integral dust and weed guard or shield and the spring which resiliently holds the latter in correct assembly with the other component parts;

FIG. 5 is an exploded perspective view on the same scale as FIG. 1, showing the details of one side of the fixed colter blade shaft hanger bracket in conjunction with a fragmentary end portion of the hanger yoke; and FIG. 6 is a fragmentary bottom plan view of the assembly of FIG. 2, showing the pivotal hanger yoke, spindle and stop attachment means for limiting the lateral pivotal swinging movements of the hanger yoke and colter disc about the hanger spindle, and with the grease fitting omitted for the sake of clarity.

Referring to the drawings, which are illustrative of one practical embodiment of my invention, like reference characters designate corresponding parts throughout the several figures. A broadly designates the overall colter device which includes my improved bearing assembly B for the colter disc C (the latter being shown in broken outline), having adjustable hanger means H pivotally carried by a hanger spindle S which, in turn, dependingly supports the aforesaid components upon the beam or similar support (not shown) of a conventional plow or other agricultural implement.

The specific details of the bearing assembly B are best seen in FIG. 3, said assembly including a non-rotatable shaft or fixed axle 1 having opposite ends 2, 2 of uniform diameter and an enlarged cylindrical bearing hub 3 provided intermediate the ends 2, 2. Rotatably carried upon the hub 3 is a two-part bearing housing 4 which also serves to carry the colter disc C therebetween. The two parts of the housing 4 comprise symmetrical halves 5, 5. Each half 5 has an annular wall 6, a radially inwardly directed wall 7, both of which conform in size and shape to rotatably seat about the hub 3 aforesaid, and a radially outwardly directed flange 8 spaced laterally outwardly from the extreme inner end or edge 9 of wall 6. This lateral spacing of flange 8 from edge 9 is preferably one-half, or slightly less than one-half, of the thickness of the colter disc C so as to assure a smooth and tight abutment of the edges 9, 9, as well as a tight gripping of the colter disc C, when the two halves 5, 5 are held in assembly, as by a plurality of bolt-and-nut assemblies 10. This particular spacing and abutting relationship is also necessary to preclude loss of a lubricant which otherwise would work out between the housing or shell components 5, 5 as the lubricant is directed to the outer periphery of the bearing hub 3 in the following manner.

To assure adequate lubrication of the rotary housing 4 upon the fixed bearing hub 3, the hub 3 is provided with an annular lubricant groove 11, preferably formed in the outer periphery thereof. Lubricant is directed to this peripheral groove 11 preferably at two places, as by a diametrical lubricant passageway 12 suitably provided through the hub 3 and communicating at its midpoint with an axial lubricant passageway 13 provided in one of the shaft ends 2. The outer end of passageway 13 is preferably closed by means of a removable threaded plug 14, while adjacent the inner end of said plug 14, there is provided still another radial lubricant passageway 15 which provides lubricant communication between passageway 13 and an elongated lubricant fitting 16 removably carried by one arm of the hanger means H. The fitting 16 may have the form of a standard or conventional grease fitting provided with the usual nippled outer end 17, a tool engaging collar or nut portion 18 and a threaded mounting end 19. The fitting 16 also serves the additional function of a setscrew, with the threaded end 19 being used as the shaft-engaging end which is seated tightly against the adjacent shaft end 2 to help secure the latter against rotation within one of the pair of hanger brackets 20.

Each of the hanger brackets 20, 20 is provided near one end with a bore 21 to complementally receive the respective shaft end 2, 2. A conventional threaded setscrew 22 may be used in the other hanger bracket 20 not having the lubricant fitting to secure the other shaft end 2 against rotation, with the inner end 23 of setscrew 22 seating in a small depression 24 in said shaft end 2 (see FIG. 3). The hanger brackets 20, 20 are additionally provided with channel-like end portions 25, 25, respectively, to complementally receive the ends 26, 26 of a hanger yoke 27 forming part of the hanger means H. The yoke ends 26, 26 are respectively provided with apertures 28, 28, each aperture 28 being adapted for alignment with one of a pair of selective adjustment apertures 29, 29 which, in turn, are provided in the channel portion 25 of each hanger bracket 20. Bolt-and-nut assemblies 30 are preferably used to removably secure the hanger brackets 20 to the ends 26 of the hanger yoke 27.

Referring again to the bearing housing or shell 4, each of the housing halves 5, 5 is further provided with an annular wall or sleeve 30 which extends axially outward from approximately the midpoint of radial wall 7 to form an annular recess 31 between wall 30 and the corresponding shaft end 2. A suitable packing, such as the split ring packing 32 shown in FIGS. 3 and 4, is compactly disposed within each recess 31 to preclude loss of lubricant from within the housing 4. To retain the packing in proper snug engagement and to preclude entrance of dirt or other foreign matter into the bearing, a unique and preferably integral combined dust and weed shield 33 is resiliently interposed between each packing ring 32 and hanger bracket 20. Each shield 33 comprises a dust cup portion 34 having an annular wall 35 which telescopically fits over the annular wall 30 aforesaid, and an inwardly radially projecting wall 36. The inner face of wall 36 is resiliently urged against the packing ring 32 by a spring 37 seating against the outer face of the wall and within an axially extended spring housing sleeve 38 projecting outwardly from wall 36 toward and terminating just short of the hanger bracket 20. Thus, it is apparent that this combined dirt and weed shield 33 effectively protects the bearing assembly and assures a long and trouble-free operation, as long as a proper supply of lubricant is maintained within the lubricant passageways and annular lubricant groove 11 within the bearing housing 4.

The hanger means H, which comprises the yoke 27 and hanger brackets 20, 20, cooperates with the hanger spindle S to complete the mounting of the colter assembly in a conventional manner upon a beam (not shown) of a plow or other implement. Spindle S is illustrated as being generally crank-shaped and has an upper shank 39 for attachment to said beam, and a offset round lower shank 40, preferably of smaller diameter than the upper shank 39, to fit loosely through a bore 41 provided in the forward part of the yoke 27. A washer 42 and cotter pin 43 serve to retain the yoke and spindle in assembly.

A stop limit collar 44, to limit the lateral swinging movements of the hanger yoke and colter disc, is preferably removably attached to the lower shank 40, as by a setscrew 45, just above the hanger yoke 27 as better seen in FIGS. 1 and 2. Collar 44 is provided with a forwardly and downwardly extended arcuate lip segment or lug 46 having abutment ends 47, 47 against which shoulders 48, 48 respectively formed on the upper opposite sides of the forward arcuate portion of the yoke 27, abut to limit the swing of the colter disc as aforesaid. To assure free and easy pivotal motion of the yoke 27 and colter disc C about the lower shank 40, a suitable lubricant fitting 49 (best seen in FIG. 2 but omitted from FIG. 6 for clarity purposes) is threadedly disposed within the front arcuate wall of the yoke 27 and is adapted to direct lubricant through a passageway 50 to the shank bore 41.

While the specific details of my invention have been herein illustrated and described, various changes and alterations may be resorted to without departing from the spirit and scope of the invention as defined in the appended claims.

I claim:

1. A colter assembly for agricultural implements, comprising a generally cylindrical bearing including a non-rotatable axle member having an enlarged cylindrical hub disposed substantially midway between the opposite ends of said axle member, a two-part housing shell composed of complementary halves rotatably mounted on the hub aforesaid in juxtaposed relation to each other and having means for mounting a colter disc therebetween for rotation therewith, about the hub, said axle member having lubricating passageways provided therein and extending radially inwardly from a lubricant inlet at the outer periphery thereof and thence axially therethrough from one end of said axle member and communicating with a diametrical passageway provided substantially through the middle of said hub, said hub being further provided with an annular peripheral lubricant distribution groove communicating with the opposite ends of the diametrical passageway aforesaid through the hub, hanger means fixedly connected to the opposite ends of said axle member for supporting the latter, said hanger means including a unitary yoke having a pair of laterally spaced arms in which the opposite ends of the axle member are respectively seated and anchored thereto, one of said arms having a hollow lubricant fitting threadedly mounted therein and extending therethrough into clamping engagement with the periphery of the axle member adjacent to and around the radially extended passageway aforesaid, said fitting communicating with the radially extended pasageway in the axle member, each half of the housing shell being provided with an annular flange extending axially outwardly therefrom in radially spaced relation to the axle member, an annular packing member seated within each annular flange aforesaid and encircling the axle member, a cup member telescopically fitting about each annular flange aforesaid for retaining the respective packing members therein, said cup member having a radially inwardly extended flange abutting the outer face of the annular packing member, a coil spring interposed between each cup member and its adjacent hanger arm, with one end of each spring seated on the adjacent hanger arm and its other end seated on the radially inwardly extended flange of the opposing cup member, said coil springs encircling the shaft member and yieldably urging the cup members into firm seating engagement with the respective packing members, with consequent yieldable compression of the latter, and an annular dirt and weed guard sleeve extended axially from the outer face of each cup member and terminating in close proximity to the adjacent hanger member, said sleeves being radially spaced from the axle member and enclosing the respective coil springs therein.

2. A colter assembly as defined in claim 1, wherein the end of the yoke opposite to the axle seating ends of the arms is provided with a supporting spindle on which the yoke is pivotally mounted for limited free movements in laterally opposite directions, and a collar disposed on said spindle and having means for releasably clamping the same thereto to restrain the collar from rotation on the spindle, said collar having a stop lug extended axially from one edge thereof for cooperative engagement with opposite sides of the yoke at the end of the latter adjacent the spindle for limiting pivotal movements of the yoke about the spindle, said stop lug being arcuately extended for a substantial distance to opposite sides of a dametrical plane projected through the central axis of the spindle, with the lug being spaced outwardly from the end of the yoke.

References Cited in the file of this patent

UNITED STATES PATENTS

| | | |
|---|---|---|
| 328,127 | Loomer | Oct. 13, 1885 |
| 894,316 | Edwards | July 28, 1908 |
| 947,759 | Putnam | Jan. 25, 1910 |
| 984,103 | Paul | Feb. 14, 1911 |
| 1,003,864 | Avery | Sept. 19, 1911 |
| 1,170,771 | Miller | Feb. 8, 1916 |
| 1,300,833 | Gerwen | Apr. 15, 1919 |
| 1,301,339 | Van Brunt | Apr. 22, 1919 |
| 1,526,586 | Becker | Feb. 17, 1925 |
| 1,860,305 | Baseman | May 24, 1932 |
| 2,247,685 | Hipple | July 1, 1941 |
| 2,259,648 | Lucas | Oct. 21, 1941 |
| 2,356,770 | Lohman | Aug. 29, 1944 |